United States Patent
Ramasamy et al.

(10) Patent No.: US 11,021,644 B2
(45) Date of Patent: Jun. 1, 2021

(54) DRILLING FLUIDS AND METHODS OF MAKING THEREOF

(71) Applicant: Saudi Arabian Oil Company, Dhahran (SA)

(72) Inventors: Jothibasu Ramasamy, Dhahran (SA); Md Amanullah, Dhahran (SA); Abdullah Saleh Al-Yami, Dhahran (SA); Ali Radhwan, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/567,639

(22) Filed: Sep. 11, 2019

(65) Prior Publication Data

US 2021/0071060 A1 Mar. 11, 2021

(51) Int. Cl.
C09K 8/36 (2006.01)
C09K 8/035 (2006.01)
C09K 8/14 (2006.01)

(52) U.S. Cl.
CPC ............... *C09K 8/36* (2013.01); *C09K 8/035* (2013.01); *C09K 8/145* (2013.01); *C09K 2208/28* (2013.01)

(58) Field of Classification Search
CPC .......... C09K 8/36; C09K 8/035; C09K 8/145; C09K 2208/28
See application file for complete search history.

(56) References Cited

U.S. PATENT DOCUMENTS

| | | | |
|---|---|---|---|
| 3,361,213 A | 1/1968 | Savins | |
| 5,198,416 A * | 3/1993 | Hale | C09K 8/36 507/136 |
| 8,193,125 B2 | 6/2012 | Muller et al. | |
| 8,413,745 B2 | 4/2013 | Xiang et al. | |
| 9,115,326 B2 | 8/2015 | Elomari et al. | |
| 2004/0082487 A1* | 4/2004 | Breeden | C09K 8/035 508/486 |
| 2010/0298176 A1* | 11/2010 | Maker | C09K 8/32 507/138 |

FOREIGN PATENT DOCUMENTS

| | | |
|---|---|---|
| WO | 2008006065 A1 | 1/2008 |
| WO | 2012087354 A1 | 6/2012 |
| WO | 2015171700 A1 | 11/2015 |

OTHER PUBLICATIONS

International Search Report and Written Opinion dated May 29, 2020 pertaining to International application No. PCT/US2019/069068 filed Dec. 31, 2019, 12 pgs.
Din et al. "Glycerol to Polyglycerol: Value-Addition of Biodiesel By-Product" MPOB Information Series, ISSN 1511-7871, Jun. 2010, 4 pgs.
"Cost Effectiveness" Article, Middle East Well Evaluation Review, 12 pgs., Nov. 1996.
Polyglycerol-4, Product Data Sheet, Jun. 2008, 1 pg.
Material Safety Data Sheet, Halliburton, Revision date Jun. 2, 2017, 5 pgs.
Material Safety Data Sheet, Drilling Fluids, Baker Hughes, Mar. 1994, 2 pgs.
EP (Extreme Pressure) and Lubricity Tester, Instruction Manual, OFITE, Dependable Products From People You Trust, Updated Jun. 5, 2017, 27 pgs.

\* cited by examiner

*Primary Examiner* — Alicia Bland

(74) *Attorney, Agent, or Firm* — Dinsmore & Shohl LLP

(57) ABSTRACT

Drilling fluids and methods of making and using drilling fluids are provided. The drilling fluid includes an emulsion comprising an oleaginous phase suspended within an aqueous phase, a clay-based component in the aqueous phase, $CaCl_2$, KCl, or both in the aqueous phase, and a polyglycerol-fatty acid complex. The polyglycerol-fatty acid complex may be free of covalent crosslinks. The polyglycerol-fatty acid complex may include polyglycerol hydrogen bonded to a fatty acid, and the oleaginous phase may include safra oil and the polyglycerol-fatty acid complex. Methods of producing the drilling fluid include reacting polyglycerol and a fatty acid at a temperature of less than 250° C. thereby forming a polyglycerol-fatty acid complex. The method further includes mixing an aqueous phase, a clay-based component, and the polyglycerol-fatty acid complex to produce a drilling fluid.

19 Claims, No Drawings

DRILLING FLUIDS AND METHODS OF MAKING THEREOF

TECHNICAL FIELD

Embodiments of the disclosure generally relate to drilling fluids and methods of making drilling fluids.

BACKGROUND

Drilling fluids in the oil and gas industries perform a myriad of tasks, including cleaning a well, holding cuttings in suspension, reducing friction, lubricating the drilling tools, maintaining stability of a wellbore, and preventing fluid loss, to name a few. A major objective of drilling fluids is to reduce friction between the drill string, the casing, or the wellbore. In this way, drilling fluids act as a lubricating medium between the metal-metal interface or the metal-mudcake interface during drilling operations.

However, conventional water-based drilling fluids have a coefficient of friction of greater than 0.20. Using drilling fluids with a coefficient of friction of greater than 0.20 in drilling operations may cause torque or drag within the well, leading to reduced drilling efficiency as compared to using drilling fluids with a coefficient of friction of less than 0.20. Torque or drag within the wellbore may result in equipment tear, pipe twist-off, a reduction in rate of penetration of the drillbit, or stuck pipe. Using drilling fluids with a coefficient of friction of greater than 5 in drilling operations may limit the reach of horizontal and extended reach wells as compared to using a drilling fluid with a coefficient of friction of less than 0.20.

SUMMARY

Accordingly, an ongoing need exists for drilling fluids having a coefficient of friction of less than 0.20. The present embodiments address these needs by providing drilling fluids including an emulsion having an oleaginous phase suspended within an aqueous phase. Direct emulsified drilling fluids are oil-in-water (O/W) emulsions in which oil droplets are dispersed in a water-based fluid. These emulsified drilling fluids are able to utilize characteristics of both oil-based and water-based fluids.

In one embodiment, the present disclosure relates to a method of producing a drilling fluid including reacting polyglycerol and a fatty acid at a temperature of less than 250° C. thereby forming a polyglycerol-fatty acid complex. The method further includes mixing an aqueous phase, a clay-based component, and the polyglycerol-fatty acid complex to produce a drilling fluid.

In additional embodiments, the present disclosure relates to drilling fluid including an emulsion comprising an oleaginous phase suspended within an aqueous phase; a clay-based component in the aqueous phase; $CaCl_2$, KCl, or both in the aqueous phase; and a polyglycerol-fatty acid complex. The polyglycerol-fatty acid complex may be free of covalent crosslinks. The polyglycerol-fatty acid complex may include polyglycerol hydrogen bonded to a fatty acid, and the oleaginous phase may include safra oil and the polyglycerol-fatty acid complex.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

The drilling fluids of the present disclosure may be used in the oil and gas drilling industries, such as for drilling in oil and gas wells. Oil and gas wells may be formed in subterranean portions of the Earth, sometimes referred to as subterranean geological formations. The wellbore may serve to connect natural resources, such as petrochemical products, to a ground level surface. In some embodiments, a wellbore may be formed in the geological formation, such as by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, the drilling fluid, known as "drilling mud," may be utilized during the drilling process. To remove the rock cuttings from the bottom of the wellbore, drilling fluid is pumped down through the drill string to the drill bit. The drilling fluid may cool the drill bit and lift the rock cuttings away from the drill bit and may carry the rock cuttings upwards as the drilling fluid is recirculated back to the surface. The drilling fluid serves several functions in the drilling process. The drilling fluid may provide lubrication and may cool the drill bit. The drilling fluid may also transport rock cuttings from the drill bit to the surface, which may be referred to as "cleaning" the wellbore. Additionally, the drilling fluid may provide hydrostatic pressure in the wellbore to provide support to the sidewalls of the wellbore and prevent the sidewalls from collapsing and caving in on the drill string. The drilling fluid may also prevent fluids in the downhole formations from flowing into the wellbore during drilling operations.

To accomplish these functions, the drilling fluid may be formulated to have specific characteristics, such as density, viscosity, solids content, pump-ability and hole-cleaning capability. In particular, the drilling fluid may be formulated to have a density in a range suitable to provide the necessary hydrostatic pressure to support the sidewalls of the wellbore and prevent fluids in the formation from flowing into the wellbore. Additionally, the drilling fluids may be formulated to have specific rheological properties that allow the drilling fluid to be pumped down through the drill string while still capturing and conveying rock cuttings from the drill bit to the top of the wellbore. In some embodiments, the drilling fluids may include solid particles suspended in a base fluid. The solid particles, sometimes referred to as a weighting agent, may increase the density of the drilling fluid to help the drilling fluid support the sidewalls of the wellbore are well as increase the hydrostatic pressure to keep fluids from the formation from flowing into the wellbore. In embodiments, the drilling fluids may be able to provide the necessary hydrostatic pressure without the use of solid particles to increase the density of the fluid.

The drilling fluids of the present disclosure may overcome these difficulties by providing improved rheology characteristics, such as reduced coefficient of friction and viscosity, as compared to conventional drilling fluids. Embodiments of the present disclosure generally relate to emulsified drilling fluids containing an aqueous phase, an oleaginous phase, and a polyglycerol-fatty acid complex. As used throughout the disclosure, "aqueous phase" refers to a fluid containing, producing, resembling, or having the properties of water. Similarly, "oleaginous phase" refers to a fluid containing, producing, resembling, or having the properties of oil.

As stated, the aqueous phase may be any suitable fluid containing, producing, resembling, or having the properties of water. The aqueous phase may include fresh water, salt water, brine, municipal water, formation water, produced water, well water, filtered water, distilled water, sea water, or combinations thereof. The aqueous phase in some embodiments may use water containing organic compounds or salt. Without being bound by any particular theory, salt or organic compounds may be incorporated into the aqueous phase to control the density of the emulsified drilling fluid. Increasing the saturation of the aqueous phase by increasing the salt concentration or the level of organic compounds in the aqueous phase may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides or combinations of these. In some particular embodiments, brine may be used in the aqueous phase. Without being bound by any particular theory, brine may be used to create osmotic balance between the drilling fluid and the subterranean formation.

In some embodiments, the drilling fluid may contain from 10 weight percent (wt. %) to 70 wt. % of the aqueous phase based on the total weight of the drilling fluid. In some embodiments, the drilling fluid may contain from 28 pounds per barrel (lb/bbl) to 630 lbs/bbl, from 30 to 600 lb/bbl, from 50 to 500 lb/bbl, from 100 to 500 lb/bbl, 200 to 500 lb/bbl, or 300 to 600 lb/bbl of the aqueous phase.

The aqueous phase may include a clay-based component. The clay-based component may include lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin ($Al_2Si_2O_5(OH)_4$ or kaolinite), alumina ($Al_2O_3$, or aluminum oxide), silicon carbide, tungsten carbide, or combinations thereof. In some embodiments, the clay-based component may be bentonite. Without being bound by any particular theory, use of a clay-based component may increase the viscosity and rheology of the drilling fluid as compared to a drilling fluid without a clay-based component to allow for better drill lubrication, shear strength, and transportation of cuttings.

The drilling fluid may contain from 0.01 wt. % to 80 wt. % of the clay-based component based on the total weight of the drilling fluid. The drilling fluid may contain from 28 to 720 lb/bbl of the clay-based component based on the total weight of the drilling fluid. In some embodiments, the drilling fluid may contain from 28 to 700 lb/bbl, or 50 to 700 lb/bbl, or 100 to 700 lb/bbl, or 200 to 500 lb/bbl of the clay-based component.

The aqueous phase may further include $CaCl_2$, KCl, or both. In embodiments, the drilling fluid may include from 1 to 20 wt. %, from 1 to 15 wt. %, from 1 to 10 wt. %, from 1 to 8 wt. %, from 1 to 6 wt. %, from 1 to 5 wt. %, from 1 to 4 wt. %, from 1 to 3 wt. %, from 1 to 2 wt. %, from 2 to 20 wt. %, from 2 to 15 wt. %, from 2 to 10 wt. %, from 2 to 8 wt. %, from 2 to 6 wt. %, from 2 to 5 wt. %, from 2 to 4 wt. %, from 2 to 3 wt. %, from 3 to 20 wt. %, from 3 to 15 wt. %, from 3 to 10 wt. %, from 3 to 8 wt. %, from 3 to 6 wt. %, from 3 to 5 wt. %, from 3 to 4 wt. %, from 2 to 20 wt. %, from 4 to 15 wt. %, from 4 to 10 wt. %, from 4 to 8 wt. %, from 4 to 6 wt. %, from 4 to 5 wt. %, from 5 to 20 wt. %, from 5 to 15 wt. %, from 5 to 10 wt. %, from 5 to 8 wt. %, from 5 to 6 wt. %, from 6 to 20 wt. %, from 6 to 15 wt. %, from 6 to 10 wt. %, from 6 to 8 wt. %, from 8 to 20 wt. %, from 8 to 15 wt. %, from 8 to 10 wt. %, from 10 to 20 wt. %, from 10 to 15 wt. %, or from 15 to 20 wt. % $CaCl_2$ based on the total weight of the drilling fluid. In embodiments, the drilling fluid may include from 1 to 20 wt. %, from 1 to 15 wt. %, from 1 to 10 wt. %, from 1 to 8 wt. %, from 1 to 6 wt. %, from 1 to 5 wt. %, from 1 to 4 wt. %, from 1 to 3 wt. %, from 1 to 2 wt. %, from 2 to 20 wt. %, from 2 to 15 wt. %, from 2 to 10 wt. %, from 2 to 8 wt. %, from 2 to 6 wt. %, from 2 to 5 wt. %, from 2 to 4 wt. %, from 2 to 3 wt. %, from 3 to 20 wt. %, from 3 to 15 wt. %, from 3 to 10 wt. %, from 3 to 8 wt. %, from 3 to 6 wt. %, from 3 to 5 wt. %, from 3 to 4 wt. %, from 2 to 20 wt. %, from 4 to 15 wt. %, from 4 to 10 wt. %, from 4 to 8 wt. %, from 4 to 6 wt. %, from 4 to 5 wt. %, from 5 to 20 wt. %, from 5 to 15 wt. %, from 5 to 10 wt. %, from 5 to 8 wt. %, from 5 to 6 wt. %, from 6 to 20 wt. %, from 6 to 15 wt. %, from 6 to 10 wt. %, from 6 to 8 wt. %, from 8 to 20 wt. %, from 8 to 15 wt. %, from 8 to 10 wt. %, from 10 to 20 wt. %, from 10 to 15 wt. %, or from 15 to 20 wt. % KCl based on the total weight of the drilling fluid.

The drilling fluid of the present embodiments also includes an oleaginous phase. As stated, the oleaginous phase refers to a fluid containing, producing, resembling, or having the properties of oil. The oleaginous phase may be oil, such as natural or synthetic liquid oil. The oleaginous phase may be or may contain diesel oil, mineral oil, hydrogenated or unhydrogenated olefins such as poly-alpha olefins, linear and branched olefins, poly-diorganosiloxanes, silxoanes, organosiloxanes, esters of fatty acids, straight chain, branched or cyclical alkyl ethers of fatty acids, or combinations of any of these. The oleaginous phase may contain esters, ethers, acetals, dialkylcarbonates, hydrocarbons or combinations of any of these. In some embodiments, the oleaginous phase may contain or may be oils derived from petroleum, such as mineral oils, diesel oils, linear olefins, paraffin, or combinations of these oils or oils derived from plants, such as safra oil. The oleaginous phase may include a polyglycerol-fatty acid complex as will be described in more detail subsequently.

The drilling fluid may contain from 1 to 20 wt. % of the oleaginous phase based on the total weight of the drilling fluid. The drilling fluid may contain from 1 to 15 wt. %, from 1 to 10 wt. %, from 1 to 8 wt. %, from 1 to 5 wt %, from 1 to 3 wt. %, from 3 to 20 wt. %, from 3 to 10 wt. %, from 3 to 8 wt. %, from 3 to 5 wt %, from 5 to 20 wt. %, from 5 to 10 wt. %, from 5 to 8 wt. %, from 8 to 20 wt. %, from 8 to 10 wt. %, from 10 to 20 wt. %, from 10 to 15 wt. %, or from 15 to 20 wt. % of the oleaginous phase based on the total weight of the drilling fluid.

In embodiments, the drilling fluid may include from 0.1 to 2.0 wt. %, from 0.1 to 1.5 wt. %, from 0.1 to 1.0 wt. %, from 0.1 to 0.8 wt. %, from 0.1 to 0.5 wt. %, from 0.1 to 0.3 wt. %, from 0.3 to 2.0 wt. %, from 0.3 to 1.5 wt. %, from 0.3 to 1.0 wt. %, from 0.3 to 0.8 wt. %, from 0.3 to 0.5 wt. %, from 0.5 to 2.0 wt. %, from 0.5 to 1.5 wt. %, from 0.5 to 1.0 wt. %, from 0.5 to 0.8 wt. %, from 0.8 to 2.0 wt. %, from 0.8 to 1.5 wt. %, from 0.8 to 1.0 wt. %, from 1.0 to 2.0 wt. %, from 1.0 to 1.5 wt. %, or from 1.5 to 2.0 wt. % safra oil based on the total weight of the drilling fluid.

The emulsified drilling fluid may include a polyglycerol-fatty acid complex. In embodiments, the polyglycerol-fatty acid complex may be free of covalent crosslinks. As used throughout this disclosure, the phrase "free of covalent crosslinks" means that there are no covalent bonds. Specifically, the polyglycerol-fatty acid complex may have no covalent bonds between the polyglycerol and the fatty acid. Without intending to be bound by theory, it is contemplated that because the polyglycerol-fatty acid complex is free of covalent crosslinks, the polyglycerol-fatty acid complex may coat the clay-based component more effectively than a polyglycerol-fatty acid complex including covalent crosslinks, thereby resulting in a coefficient of friction less than a coefficient of friction in a drilling fluid including a polyglycerol-fatty acid complex including covalent crosslinks. The polyglycerol-fatty acid complex may include hydrogen bonds between the polyglycerol and the fatty acid. The drilling fluid may include from 0.5 to 20 volume percent (vol. %), from 0.5 to 10 vol. %, from 0.5 to 8 vol. %, from 0.5 to 6 vol. %, from 0.5 to 5 vol. %, from 0.5 to 4 vol. %, from 0.5 to 3 vol. %, from 0.5 to 2 vol. %, from 0.5 to 1 vol. %, from 1 to 20 vol. %, from 1 to 10 vol. %, from 1 to 8 vol. %, from 1 to 6 vol. %, from 1 to 5 vol. %, from 1 to 4 vol. %, from 1 to 3 vol. %, from 1 to 2 vol. %, from 2 to 20 vol. %, from 2 to 10 vol. %, from 2 to 8 vol. %, from 2 to 6 vol. %, from 2 to 5 vol. %, from 2 to 4 vol. %, from 2 to 3 vol. %, from 3 to 20 vol. %, from 3 to 10 vol. %, from 3 to 8 vol. %, from 3 to 6 vol. %, from 3 to 5 vol. %, from 3 to 4 vol. %, from 4 to 20 vol. %, from 4 to 10 vol. %, from 4 to 8 vol. %, from 4 to 6 vol. %, from 4 to 5 vol. %, from 5 to 20 vol. %, from 5 to 10 vol. %, from 5 to 8 vol. %, from 5 to 6 vol. %, from 6 to 20 vol. %, from 6 to 10 vol. %, or from 10 to 20 vol. % polyglycerol-fatty acid complex based on the total volume of the drilling fluid.

The polyglycerol-fatty acid complex may be formed by reacting polyglycerol and a fatty acid to form the polyglycerol-fatty acid complex. The reaction may occur at a temperature of less than 250° C., less than 200° C., less than 175° C., less than 150° C., less than 125° C., less than 100° C., less than 80° C., less than 70° C., less than 60° C., less than 55° C., or less than 50° C. The reaction may occur at a temperature of from 40° C. to 250° C., from 40° C. to 200° C., from 40° C. to 175° C., from 40° C. to 150° C., from 40° C. to 125° C., from 40° C. to 100° C., from 40° C. to 80° C., from 40° C. to 70° C., from 40° C. to 60° C., from 40° C. to 55° C., from 40° C. to 50° C., from 40° C. to 45° C., from 45° C. to 250° C., from 45° C. to 200° C., from 45° C. to 175° C., from 45° C. to 150° C., from 45° C. to 125° C., from 45° C. to 100° C., from 45° C. to 80° C., from 45° C. to 70° C., from 45° C. to 60° C., from 45° C. to 55° C., from 45° C. to 50° C., from 50° C. to 250° C., from 50° C. to 200° C., from 50° C. to 175° C., from 50° C. to 150° C., from 50° C. to 125° C., from 50° C. to 100° C., from 50° C. to 80° C., from 50° C. to 70° C., from 50° C. to 60° C., from 50° C. to 55° C., from 55° C. to 250° C., from 55° C. to 200° C., from 55° C. to 175° C., from 55° C. to 150° C., from 55° C. to 125° C., from 55° C. to 100° C., from 55° C. to 80° C., from 55° C. to 70° C., from 55° C. to 60° C., from 60° C. to 250° C., from 60° C. to 200° C., from 60° C. to 175° C., from 60° C. to 150° C., from 60° C. to 125° C., from 60° C. to 100° C., from 60° C. to 80° C., from 60° C. to 70° C., from 70° C. to 250° C., from 70° C. to 200° C., from 70° C. to 175° C., from 70° C. to 150° C., from 70° C. to 125° C., from 70° C. to 100° C., from 70° C. to 80° C., from 80° C. to 250° C., from 80° C. to 200° C., from 80° C. to 175° C., from 80° C. to 150° C., from 80° C. to 125° C., from 80° C. to 100° C., from 100° C. to 250° C., from 100° C. to 200° C., from 100° C. to 175° C., from 100° C. to 150° C., or from 100° C. to 125° C.

The fatty acid may include saturated long chain carboxylic acid having a chain length of from $C_5$ to $C_{50}$. The saturated long chain carboxylic acid may have a chain length of from $C_5$ to $C_{50}$, from $C_5$ to $C_{30}$, from $C_5$ to $C_{25}$, from $C_5$ to $C_{20}$, from $C_5$ to $C_{18}$, from $C_5$ to $C_{17}$, from $C_5$ to $C_{16}$, from $C_5$ to $C_{15}$, from $C_5$ to $C_{12}$, from $C_5$ to $C_{10}$, from $C_{10}$ to $C_{50}$, from $C_{10}$ to $C_{30}$, from $C_{10}$ to $C_{25}$, from $C_{10}$ to $C_{20}$, from $C_{10}$ to $C_{18}$, from $C_{10}$ to $C_{17}$, from $C_{10}$ to $C_{16}$, from $C_{10}$ to $C_{15}$, from $C_{10}$ to $C_{12}$, from $C_{12}$ to $C_{50}$, from $C_{12}$ to $C_{30}$, from $C_{12}$ to $C_{25}$, from $C_{12}$ to $C_{20}$, from $C_{12}$ to $C_{18}$, from $C_{12}$ to $C_{17}$, from $C_{12}$ to $C_{16}$, from $C_{12}$ to $C_{15}$, from $C_{15}$ to $C_{50}$, from $C_{15}$ to $C_{30}$, from $C_{15}$ to $C_{25}$, from $C_{15}$ to $C_{20}$, from $C_{15}$ to $C_{18}$, from $C_{15}$ to $C_{17}$, from $C_{15}$ to $C_{16}$, from $C_{16}$ to $C_{50}$, from $C_{16}$ to $C_{30}$, from $C_{16}$ to $C_{25}$, from $C_{16}$ to $C_{20}$, from $C_{16}$ to $C_{18}$, from $C_{16}$ to $C_{17}$, from $C_{17}$ to $C_{50}$, from $C_{17}$ to $C_{30}$, from $C_{17}$ to $C_{25}$, from $C_{17}$ to $C_{20}$, from $C_{17}$ to $C_{18}$, from $C_{18}$ to $C_{50}$, from $C_{18}$ to $C_{30}$, from $C_{18}$ to $C_{25}$, from $C_{18}$ to $C_{20}$, from $C_{20}$ to $C_{50}$, from $C_{20}$ to $C_{30}$, or from $C_{20}$ to $C_{25}$.

In specific embodiments, the fatty acid may include palmitic acid, stearic acid, or both. In embodiments, the fatty acid may include from 5 to 60 volume percent (vol. %), from 5 to 50 vol. %, from 5 to 45 vol. %, from 5 to 40 vol. %, from 5 to 35 vol. %, from 5 to 30 vol. %, from 5 to 25 vol. %, from 5 to 20 vol. %, from 5 to 15 vol. %, from 5 to 10 vol. %, from 10 to 60 vol. %, from 10 to 50 vol. %, from 10 to 45 vol. %, from 10 to 40 vol. %, from 10 to 35 vol. %, from 10 to 30 vol. %, from 10 to 25 vol. %, from 10 to 20 vol. %, from 10 to 15 vol. %, from 15 to 60 vol. %, from 15 to 50 vol. %, from 15 to 45 vol. %, from 15 to 40 vol. %, from 15 to 35 vol. %, from 15 to 30 vol. %, from 15 to 25 vol. %, from 15 to 20 vol. %, from 20 to 60 vol. %, from 20 to 50 vol. %, from 20 to 45 vol. %, from 20 to 40 vol. %, from 20 to 35 vol. %, from 20 to 30 vol. %, from 20 to 25 vol. %, from 25 to 60 vol. %, from 25 to 50 vol. %, from 25 to 45 vol. %, from 25 to 40 vol. %, from 25 to 35 vol. %, from 25 to 30 vol. %, from 30 to 60 vol. %, from 30 to 50 vol. %, from 30 to 45 vol. %, from 30 to 40 vol. %, from 30 to 35 vol. %, from 35 to 60 vol. %, from 35 to 50 vol. %, from 35 to 45 vol. %, from 35 to 40 vol. %, from 40 to 60 vol. %, from 40 to 50 vol. %, from 40 to 45 vol. %, from 45 to 60 vol. %, from 45 to 50 vol. %, or from 50 to 60 vol. % palmitic acid based on the total volume of the fatty acid.

Various amounts of fatty acid are contemplated as suitable within the drilling fluid. The fatty acid may include from 40 to 95 vol. %, from 40 to 90 vol. %, from 40 to 85 vol. %, from 40 to 80 vol. %, from 40 to 75 vol. %, from 40 to 70 vol. %, from 40 to 65 vol. %, from 40 to 60 vol. %, from 40 to 55 vol. %, from 40 to 50 vol. %, from 40 to 45 vol. %, from 45 to 95 vol. %, from 45 to 90 vol. %, from 45 to 85 vol. %, from 45 to 80 vol. %, from 45 to 75 vol. %, from 45 to 70 vol. %, from 45 to 65 vol. %, from 45 to 60 vol. %, from 45 to 55 vol. %, from 45 to 50 vol. %, from 50 to 95 vol. %, from 50 to 90 vol. %, from 50 to 85 vol. %, from 50 to 80 vol. %, from 50 to 75 vol. %, from 50 to 70 vol. %, from 50 to 65 vol. %, from 50 to 60 vol. %, from 50 to 55 vol. %, from 55 to 95 vol. %, from 55 to 90 vol. %, from 55 to 85 vol. %, from 55 to 80 vol. %, from 55 to 75 vol. %, from 55 to 70 vol. %, from 55 to 65 vol. %, from 55 to 60 vol. %, from 60 to 95 vol. %, from 60 to 90 vol. %, from 60 to 85 vol. %, from 60 to 80 vol. %, from 60 to 75 vol. %, from 60 to 70 vol. %, from 60 to 65 vol. %, from 65 to 95 vol. %, from 65 to 90 vol. %, from 65 to 85 vol. %, from 65 to 80 vol. %, from 65 to 75 vol. %, from 65 to 70 vol. %, from 70 to 95 vol. %, from 70 to 90 vol. %, from 70 to 85 vol. %, from 70 to 80 vol. %, from 70 to 75 vol. %, from 75 to 95 vol. %, from 75 to 90 vol. %, from 75 to 85 vol. %, from 75 to 80 vol. %, from 80 to 95 vol. %, from 80 to 90 vol. %, from 80 to 85 vol. %, from 85 to 95 vol. %, from 85 to 90 vol. %, or from 90 to 95 vol. % stearic acid based on the total volume of the fatty acid.

The polyglycerol may not be crosslinked. The molar ratio of polyglycerol to fatty acid may range from 0.5:1 to 2:1, from 0.5:1 to 1.5:1, from 0.5:1 to 1.2:1, from 0.5:1 to 1:1, from 0.5:1 to 0.8:1, from 0.8:1 to 2:1, from 0.8:1 to 1.5:1, from 0.8:1 to 1.2:1, from 0.8:1 to 1:1, from 1:1 to 2:1, from 1:1 to 1.5:1, from 1:1 to 1.2:1, from 1.2:1 to 2:1, from 1.2:1 to 1.5:1, or from 1.5:1 to 2:1. In embodiments, the molar ratio of polyglycerol to fatty acid may be 0.5:1, 0.8:1, 1:1, 1.2:1, 1.5:1, or 2:1.

In some embodiments, the drilling fluid may contain at least one additive other than the polyglycerol-fatty acid complex. The one or more additives may be any additives known to be suitable for drilling fluids. As non-limiting examples, suitable additives may include weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof. In some particular embodiments, the one or more additives may include organoclay, such as VG 69 organoclay, which is an amine-treated bentonite used as a viscosifier and gelling agent that is commercially available from Schlumberger (Houston, Tex.). The one or more additives may also include a filtration control agent, such as ADAPTA® brand filtration control agent, which is a methylstyrene acrylate copolymer used to provide filtration control in non-aqueous systems, that is commercially available from Halliburton (Houston, Tex.). In some embodiments, the drilling fluid may contain both an organoclay and a filtration control agent.

In some embodiments, the one or more additives may include a viscosifier, also referred to as a rheology modifier, which may be added to the drilling fluid to impart non-Newtonian fluid rheology to the drilling fluid to facilitate lifting and conveying rock cuttings to the surface of the wellbore. Examples of viscosifiers may include, but are not limited to, bentonite, polyacrylamide, polyanionic cellulose, or combinations of these viscosifiers. In some embodiments, the drilling fluid may include xanthan gum, a polysaccharide commonly referred to Xanthan gum. The Xanthan gum may be added to the water-based drilling fluid to produce a flat velocity profile of the water-based drilling fluid in annular flow, that may help to improve the efficiency of the drilling fluid in lifting and conveying rock cuttings to the surface.

The drilling fluid may include at least one surfactant. The surfactant may be anionic, cationic, or neutral. Nonlimiting examples of anionic surfactants include sulfonated polymers, sulfonated alkanes, polycarboxylated ethers, or combinations thereof. Nonlimiting examples of cationic surfactants include trimethylalkylammonium salts, alkylbenxylammonium salts, or combinations thereof. Nonlimiting examples of neutral surfactants include proteins, polyethylene glycol derivatives, oligosaccharides, cholesterol derivatives, or combinations thereof. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the hydraulic fracturing fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

In some embodiments, the one or more additives may include solids, sometimes referred to as weighting material, which may be dispersed in the drilling fluid. The solids may be finely divided solids having a specific gravity (SG) of greater than 1 that may be added to the drilling fluid to increase the density of the drilling fluid. Examples of weighting materials suitable for use as the solid include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), or any combination of these weighting materials. In some embodiments, the drilling fluid may include barite as the solid.

In embodiments, the drilling fluid may have a solids content of from 1 wt. % to 80 wt. % based on the weight of the solid weighing material based on the total weight of the drilling fluid. The drilling fluid may have a solids content of from 2.5 lb/bbl to 720 lb/bbl, such as from 2.5 to 720 lb/bbl, or 2.5 to 700 lb/bbl. In some embodiments, the drilling fluid may have a solids content of from 5 to 700 lb/bbl, from 50 to 500 lb/bbl, or from 100 to 600 lb/bbl.

Alternatively, in some embodiments, solids may not be needed to stabilize the drilling fluid. Thus, in some embodiments, the drilling fluid may not contain solids, or may not contain more than 2 lbs/bbl, such as less than 1 lb/bbl of solids.

As stated, the addition of solids may be used to control the density of the drilling fluid. In some embodiments, the drilling fluid may have a density of from 50 pounds of mass per cubic foot (pcf) to 160 pcf, as measured using a mud balance in accordance with the American Petroleum Institute (API) recommended practice 13B-2. For instance, the drilling fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the drilling fluid may have a density of from 50 pcf to 75 pcf, or from 75 pcf to 100 pcf, or from 120 pcf to 160 pcf.

Embodiments of the disclosure further relate to methods of producing a drilling fluid. The produced drilling fluids may be in accordance with any of the embodiments previously described. The method may involve reacting the polyglycerol and fatty acid to form a polyglycerol-fatty acid complex as described previously. The method may further include mixing an aqueous phase, an oleaginous phase, and the polyglycerol-fatty acid complex to produce the drilling fluid. The aqueous phase, oleaginous phase, and the polyglycerol-fatty acid complex may be in accordance with any of the embodiments previously described.

In some embodiments, mixing the aqueous phase, clay-based component, and polyglycerol-fatty acid complex may include shearing. The drilling fluid may be mixed at a shear speed of from 4000 rotations per minute (RPM) to 16000 RPM. The mixture may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM. Without being bound by any particular theory, shearing the mixture may disperse the oleaginous phase in the aqueous phase to produce the drilling fluid, which may be emulsified. In some embodiments, the oil-to-water ratio (OWR) may range from 5:95 to 95:5.

The method may further include mixing safra oil with the aqueous phase, the clay-based component, and the polyglycerol-fatty acid complex to form the drilling fluid. The safra oil may be in accordance with any of the embodiments previously described.

The method may further include mixing $CaCl_2$, KCl, or both, with the aqueous phase, the clay-based component, and the polyglycerol-fatty acid complex to form the drilling fluid. The $CaCl_2$, KCl, or both, may be in accordance with any of the embodiments previously described.

The method may further include mixing at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof with the aqueous phase, the clay-based component, and the polyglycerol-fatty acid complex to form the drilling fluid. The additives may be in accordance with any of the embodiments previously described.

Embodiments of the disclosure may also relate to methods for using the drilling fluid. The drilling fluid may be in accordance with any of the embodiments previously described. In some embodiments, the drilling fluid may be introduced into a subterranean formation. Introducing may involve injecting the drilling fluid into the subterranean formation, which in some embodiments may be a well. The drilling fluid may be circulated within the subterranean formation. In some embodiments, a mud pump may be used to inject the drilling fluid into the subterranean formation.

In some specific embodiments the disclosure relates to methods of using the drilling fluid for oil and gas drilling. The methods may include pumping the drilling fluid through a drill string to a drill bit and recirculating the drilling fluid. Recirculating the fluid may allow the drilling fluid to cool and lubricate the drill bit and to lift rock cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

As previously described, fluid rheology is an important parameter of drilling fluid performance. For critical offshore applications with extreme temperature and pressure requirements, the viscosity profile of the fluid often is measured with a controlled temperature and pressure rotational viscometer (for instance, an iX77 Rheometer, commercially available from Fann Instruments (Houston, Tex.)). Fluids may be tested at temperatures of from 35° F. to 500° F., with pressures of up to 20,000 pounds per square inch (psi). Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the drilling fluid, such as gel strength, plastic viscosity, yield point, and coefficient of friction, may be determined from measurements of the viscosity, shear stress, and shear rate.

The coefficient of friction of the drilling fluid may be measured using an OFITE Extreme Pressure and Lubricity Tester, available from OFI Testing Equipment, Inc., headquartered in Houston, Tex. When there is relative motion between two contacting bodies, frictional forces that resist motion are critical to understanding the rheology of the fluid. The coefficient of friction, and therefore the force necessary to overcome friction, is independent of the apparent area of fluid contact. Frictional resistance to rotation of the drill string is known as torque. Friction is measured as the coefficient of friction ($\mu$) using Equation 1:

$$\mu = \frac{F}{W} \qquad \text{Equation 1}$$

where F is the frictional force required to slide the test block and test ring surfaces of the OFITE testing machine across each other at a given rate is measured by the power in amperes required to turn the test ring shaft at a prescribed rate of revolutions per minute, and W is the load or force with which the test block is pressed against the test ring through the torque arm. The standard test uses 150 inch pounds of force where the test block is 1.5 inches from the center of the torque bushing, which results in an actual force of 100 pounds applied.

The coefficient of friction of the drilling fluid may be less than 0.200, less than 0.175, less than 0.150, less than 0.125, less than 0.100, less than 0.090, less than 0.080, less than 0.070, less than 0.060, less than 0.050, less than 0.040, less than 0.030, or less than 0.020.

The gel strength of a drilling fluid refers to the shear stress of the drilling fluid measured at a shear rate less than 10 RPM following a defined period of time during which the drilling fluid is maintained in a static state. The drilling fluids of the present disclosure may have a gel strength after 10 seconds of from 0.5 to 30 pounds force per 100 square feet ($lb_f/100$ $ft^2$). In some embodiments, the drilling fluid may have a gel strength after 10 seconds of from 0.5 to 100 $lb_f/100$ $ft^2$, from 0.5 to 60 $lb_f/100$ $ft^2$, from 0.5 to 50 $lb_f/100$ $ft^2$, from 0.5 to 40 $lb_f/100$ $ft^2$, from 0.5 to 30 $lb_f/100$ $ft^2$, from 0.5 to 20 $lb_f/100$ $ft^2$, from 0.5 to 15 $lb_f/100$ $ft^2$, from 0.5 to 10 $lb_f/100$ $ft^2$, from 0.5 to 5 $lb_f/100$ $ft^2$, from 0.5 to 1 $lb_f/100$ $ft^2$, from 1 to 100 $lb_f/100$ $ft^2$, from 1 to 60 $lb_f/100$ $ft^2$, from 1 to 50 $lb_f/100$ $ft^2$, from 1 to 40 $lb_f/100$ $ft^2$, from 1 to 30 $lb_f/100$ $ft^2$, from 1 to 20 $lb_f/100$ $ft^2$, from 1 to 15 $lb_f/100$ $ft^2$, from 1 to 10 $lb_f/100$ $ft^2$, from 1 to 5 $lb_f/100$ $ft^2$, from 5 to 100 $lb_f/100$ $ft^2$, from 5 to 60 $lb_f/100$ $ft^2$, from 5 to 50 $lb_f/100$ $ft^2$, from 5 to 40 $lb_f/100$ $ft^2$, from 5 to 30 $lb_f/100$ $ft^2$, from 5 to 20 $lb_f/100$ $ft^2$, from 5 to 15 $lb_f/100$ $ft^2$, from 5 to 10 $lb_f/100$ $ft^2$, from 10 to 100 $lb_f/100$ $ft^2$, from 10 to 60 $lb_f/100$ $ft^2$, from 10 to 50 $lb_f/100$ $ft^2$, from 10 to 40 $lb_f/100$ $ft^2$, from 10 to 30 $lb_f/100$ $ft^2$, from 10 to 20 $lb_f/100$ $ft^2$, from 10 to 15 $lb_f/100$ $ft^2$, from 15 to 100 $lb_f/100$ $ft^2$, from 15 to 60 $lb_f/100$ $ft^2$, from 15 to 50 $lb_f/100$ $ft^2$, from 15 to 40 $lb_f/100$ $ft^2$, from 15 to 30 $lb_f/100$ $ft^2$, from 15 to 20 $lb_f/100$ $ft^2$, from 20 to 100 $lb_f/100$ $ft^2$, from 20 to 60 $lb_f/100$ $ft^2$, from 20 to 50 $lb_f/100$ $ft^2$, from 20 to 40 $lb_f/100$ $ft^2$, from 20 to 30 $lb_f/100$ $ft^2$, from 30 to 100 $lb_f/100$ $ft^2$, from 30 to 60 $lb_f/100$ $ft^2$, from 30 to 50 $lb_f/100$ $ft^2$, from 30 to 40 $lb_f/100$ $ft^2$, from 40 to 100 $lb_f/100$ $ft^2$, from 40 to 60 $lb_f/100$ $ft^2$, from 40 to 50 $lb_f/100$ $ft^2$, from 50 to 100 $lb_f/100$ $ft^2$, from 50 to 60 $lb_f/100$ $ft^2$, or from 60 to 100 $lb_f/100$ $ft^2$.

Similarly, the drilling fluids of the present disclosure may have a gel strength after 10 minutes of from 0.5 to 50$lb_f/100$ $ft^2$. In some embodiments, the drilling fluid may have a gel strength after 10 minutes of from 0.5 to 100 $lb_f/100$ $ft^2$, from 0.5 to 60 $lb_f/100$ $ft^2$, from 0.5 to 50 $lb_f/100$ $ft^2$, from 0.5 to 40 $lb_f/100$ $ft^2$, from 0.5 to 30 $lb_f/100$ $ft^2$, from 0.5 to 20 lb/100 ft², from 0.5 to 15 lb/100 ft², from 0.5 to 10 lb/100 ft², from 0.5 to 5 lb/100 ft², from 0.5 to 1 lb/100 ft², from 1 to 100 lb/100 ft², from 1 to 60 lb/100 ft², from 1 to 50 lb/100 ft², from 1 to 40 lb/100 ft², from 1 to 30 lb/100 ft², from 1 to 20 lb/100 ft², from 1 to 15 lb/100 ft², from 1 to 10 lb/100 ft², from 1 to 5 lb/100 ft², from 5 to 100 lb/100 ft², from 5 to 60 lb/100 ft², from 5 to 50 lb/100 ft², from 5 to 40 lb/100 ft², from 5 to 30 lb/100 ft², from 5 to 20 lb/100 ft², from 5 to 15 lb/100 ft², from 5 to 10 lb/100 ft², from 10 to 100 lb/100 ft², from 10 to 60 lb/100 ft², from 10 to 50 lb/100 ft², from 10 to 40 lb/100 ft², from 10 to 30 lb/100 ft², from 10 to 20 lb/100 ft², from 10 to 15 lb/100 ft², from 15 to 100 lb/100 ft², from 15 to 60 lb/100 ft², from 15 to 50 lb/100 ft², from 15 to 40 lb/100 ft², from 15 to 30 lb/100 ft², from 15 to 20 lb/100 ft², from 20 to 100 lb/100 ft², from 20 to 60 lb/100 ft², from 20 to 50 lb/100 ft², from 20 to 40 lb/100 ft², from 20 to 30 lb/100 ft², from 30 to 100 lb/100 ft², from 30 to 60 lb/100 ft², from 30 to 50 lb/100 ft², from 30 to 40 lb/100 ft², from 40 to 100 lb/100 ft², from 40 to 60 lb/100 ft², from 40 to 50 lb/100 ft², from 50 to 100 lb/100 ft², from 50 to 60 lb/100 ft², or from 60 to 100 lb/100 ft².

The rheological behavior of the drilling fluid may be determined by measuring the shear stress on the drilling fluid at different shear rates, which may be accomplished by measuring the shear stress or shear rate on the drilling fluid. The various shear rates are utilized as drilling fluid behaves as a rigid body at lesser shear stresses but flows as a viscous fluid at greater shear stresses. The rheology of the drilling fluid may be characterized by the plastic viscosity (PV) in centiPoise (cP) and the yield point (YP), which are parameters from the Bingham plastic rheology model. The PV is related to the resistance of the drilling fluid to flow due to mechanical interaction between the solids of the drilling fluid and represents the viscosity of the drilling fluid extrapolated to infinite shear rate. The PV reflects the type and concentration of the solids in the drilling fluid. The PV of a drilling fluid may be estimated by measuring the shear stress of the drilling fluid using the previously described rheometer at spindle speeds of 300 rotations per minute (RPM) and 600 RPM and subtracting the 300 RPM dial reading from the 600 RPM dial reading according to Equation 2:

$$PV\ (cP) = (\text{dial reading at 600 RPM}) - (\text{dial reading at 300 RPM}) \quad \text{Equation 2}$$

The drilling fluids of the present disclosure may have a PV of from 10 cP to 60 cP, from 10 cP to 55 cP, from 10 cP to 50 cP, 15 cP to 55 cP, from 15 cP to 50 cP, from 25 cP to 45 cP, from 25 cP to 40 cP, from 30 cP to 60 cP, from 30 cP to 55 cP, from 30 cP to 50 cP, from 30 cP to 45 cP, or from 30 cP to 40 cP. In some embodiments, the drilling fluid may have a PV of from 25 cP to 60 cP or from 30 cP to 55 cP.

The drilling fluid behaves as a rigid body when the shear stress is less than the YP, and the drilling fluid flows as a viscous fluid when the shear stress is greater than the YP. In other words, the YP represents the amount of stress required to move the drilling fluid from a static condition. The YP is expressed as a force per area, such as pounds of force per one hundred square feet (lb/100 ft²). YP provides an indication of the ability of the drilling fluid to carry proppants through the annulus, which in simplified terms gives an indication of the drilling fluid's hole-cleaning ability. The YP is determined by extrapolating the Bingham plastic rheology model to a shear rate of zero. The YP may be estimated from the PV (as measured in accordance with Equation 2, as previously described) according to Equation 3:

$$YP = (\text{dial reading at 300 RPM}) - PV \quad \text{Equation 3}$$

The drilling fluids of the present disclosure may have a YP of from 0.5 to 50 lb/100 ft². In some embodiments, the drilling fluids of the present disclosure may have a YP of from 0.5 to 100 lb/100 ft², from 0.5 to 60 lb/100 ft², from 0.5 to 40 lb/100 ft², from 0.5 to 30 lb/100 ft², from 0.5 to 20 lb/100 ft², from 0.5 to 15 lb/100 ft², from 0.5 to 10 lb/100 ft², from 0.5 to 5 lb/100 ft², from 0.5 to 1 lb/100 ft², from 1 to 100 lb/100 ft², from 1 to 60 lb/100 ft², from 1 to 50 lb/100 ft², from 1 to 40 lb/100 ft², from 1 to 30 lb/100 ft², from 1 to 20 lb/100 ft², from 1 to 15 lb/100 ft², from 1 to 10 lb/100 ft², from 1 to 5 lb/100 ft², from 5 to 100 lb/100 ft², from 5 to 60 lb/100 ft², from 5 to 50 lb/100 ft², from 5 to 40 lb/100 ft², from 5 to 30 lb/100 ft², from 5 to 20 lb/100 ft², from 5 to 15 lb/100 ft², from 5 to 10 lb/100 ft², from 10 to 100 lb/100 ft², from 10 to 60 lb/100 ft², from 10 to 50 lb/100 ft², from 10 to 40 lb/100 ft², from 10 to 30 lb/100 ft², from 10 to 20 lb/100 ft², from 10 to 15 lb/100 ft², from 15 to 100 lb/100 ft², from 15 to 60 lb/100 ft², from 15 to 50 lb/100 ft², from 15 to 40 lb/100 ft², from 15 to 30 lb/100 ft², from 15 to 20 lb/100 ft², from 20 to 100 lb/100 ft², from 20 to 60 lb/100 ft², from 20 to 50 lb/100 ft², from 20 to 40 lb/100 ft², from 20 to 30 lb/100 ft², from 30 to 100 lb/100 ft², from 30 to 60 lb/100 ft², from 30 to 50 lb/100 ft², from 30 to 40 lb/100 ft², from 40 to 100 lb/100 ft², from 40 to 60 lb/100 ft², from 40 to 50 lb/100 ft², from 50 to 100 lb/100 ft², from 50 to 60 lb/100 ft², or from 60 to 100 lb/100 ft².

EXAMPLES

As mentioned, the drilling fluid of the present disclosure may have improved characteristics over conventional drilling fluids, for instance, reduced coefficient of friction, pumpability and hole-cleaning capability, among other characteristics. These attributes will be demonstrated by the Examples that follow.

To demonstrate the improved rheological properties of the present embodiments, drilling fluids were formulated in accordance with the present disclosure and tested in comparison to conventional drilling fluids. To form the drilling fluids, 3.5 milliLiters (mL) safra oil was added to 3.5 mL of polyglycerol-4 available from Solvay, headquartered in Brussels, Belgium. Then, 3.5 mL of C16-C18 fatty acid available from Sabic, headquartered in Riyadh, Saudi Arabia, was added to the mixture. The mixture was then stirred for 30 minutes at 50° C. using a mixer available from Hamilton Beach, headquartered in Richmond, Va. Then, any additional additives were mixed into the drilling fluid for 2 minutes each at 50° C. Finally, after all components were added to the drilling fluid, the drilling fluid was mixed for an additional 20 minutes at at 50° C.

Table 1 includes the $CaCl_2$ drilling fluid compositions and Table 2 includes the KCl drilling fluid compositions. Comparative Example 1 is a $CaCl_2$ drilling fluid that does not include a lubricant. Comparative Example 2 is a $CaCl_2$ drilling fluid including Me-Lube®, commercially available from PreciseBits, headquartered in Palmer Lake, Colo. Example A is a $CaCl_2$ drilling fluid formulated in accordance with the present disclosure. Comparative Example 3 is a KCl drilling fluid that does not include a lubricant. Comparative Example 4 is a KCl drilling fluid including a Me-Lube®, a commercially available lubricant. Example B is a KCl drilling fluid formulated in accordance with the present disclosure. PAC LV is a polyanionic cellulose commercially available from SidleyChem® headquartered in ShanDong, China. Rev Dust™ is a friction reducing material including hydrated sodium calcium aluminosilicate, which is commercially available from Baker Hughes headquartered in Houston, Tex.

TABLE 1

CaCl₂ Drilling Fluid Compositions

|  | Comparative Example 1 | Comparative Example 2 | Example A |
|---|---|---|---|
| Water (ml) | 332 | 332 | 332 |
| Soda Ash (grams (g)) | 0.25 | 0.25 | 0.25 |
| Bentonite (g) | 5 | 5 | 5 |
| PAC LV (g) | 3 | 3 | 3 |
| Xanthan gum (g) | 1 | 1 | 1 |
| KCl (g) | 20 | 20 | 20 |
| pH | 9.5 | 9.5 | 9.5 |
| Rev Dust (g) | 25 | 25 | 25 |
| CaCl₂ (g) | 20 | 20 | 20 |
| Me-Lube ® (ml) | 0 | 7 (2 vol. %) | 0 |
| PGFA complex lubricant (ml) | 0 | 0 | 10.5 (2 vol. %) |

TABLE 2

KCl Drilling Fluid Compositions

|  | Comparative Example 3 | Comparative Example 4 | Example B |
|---|---|---|---|
| Water (ml) | 332 | 332 | 332 |
| Soda Ash (g) | 0.25 | 0.25 | 0.25 |
| Bentonite (g) | 5 | 5 | 5 |
| PAC LV (g) | 3 | 3 | 3 |
| Xanthan gum (g) | 1 | 1 | 1 |
| KCl (g) | 20 | 20 | 20 |
| pH | 9.5 | 9.5 | 9.5 |
| Me-Lube ® (ml) | 0 | 7 (2 vol. %) | 0 |
| PGFA complex lubricant (ml) | 0 | 0 | 10.5 (2 vol. %) |

Lubricity tests were carried out on each of the drilling fluid compositions using an OFITE lubricity tester. The coefficient of friction values for each drilling fluid are given in Table 3.

TABLE 3

Coefficient of Friction Values for Example Drilling Fluids

|  | Coefficient of Friction Values |
|---|---|
| Comparative Example 1 | 0.330 |
| Comparative Example 2 | 0.025 |
| Example A | 0.020 |
| Comparative Example 3 | 0.310 |
| Comparative Example 4 | 0.010 |
| Example B | 0.015 |

In the case of CaCl₂ drilling fluids, the coefficient of friction for Comparative Example 1 served as a control to benchmark the lubricity of Comparative Example 2 and Example A. The coefficient of friction for Comparative Example 1 is 0.33. Upon the addition of lubricants, a significant reduction in coefficient of friction is observed. In the case of Comparative Example 2, the coefficient of friction is 0.025 and the coefficient of friction for Example A is 0.02.

In the case of KCl drilling fluids, the coefficient of friction for Comparative Example 3 served as a control to benchmark the lubricity of Comparative Example 4 and Example B. The coefficient of friction for Comparative Example 3 is 0.31. Upon addition of lubricants, the coefficient of friction reduced significantly to 0.01 for Comparative Example 4 and 0.015 for Example B. As shown by the examples, the polyglycerol-fatty acid complex as disclosed in this specification imparts a similar coefficient of friction to drilling fluids as the Me-Lube® imparts, which is a commonly used commercially available additive.

The following description of the embodiments is exemplary and illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of producing a drilling fluid, the method comprising:
    reacting polyglycerol and a composition comprising one or more fatty acids at a temperature of less than 250° C. thereby forming a polyglycerol-fatty acid complex, in which the polyglycerol-fatty acid complex comprises hydrogen bonds between the polyglycerol and the one or more fatty acids; and
    mixing an aqueous phase, a clay-based component, and the polyglycerol-fatty acid complex to produce a drilling fluid.

2. The method of claim 1, further comprising mixing safra oil with the aqueous phase, the clay-based component, and the polyglycerol-fatty acid complex to form the drilling fluid.

3. The method of claim 1, in which reacting the polyglycerol and the composition comprising one or more fatty acids comprises reacting the polyglycerol and the composition comprising one or more fatty acids at a temperature of less than 100° C.

4. The method of claim 1, in which the drilling fluid comprises a coefficient of friction of less than 0.1.

5. The method of claim 1, in which the composition comprising one or more fatty acids comprises one or more saturated long chain carboxylic acids having a chain length of from $C_5$ to $C_{50}$.

6. The method of claim 5, in which the chain length of the one or more saturated long chain carboxylic acids ranges from $C_{16}$ to $C_{18}$.

7. The method of claim 6, in which the composition comprising one or more fatty acids comprises from 10 to 40 vol. % palmitic acid.

8. The method of claim 6, in which the composition comprising one or more fatty acids comprises from 50 to 90 vol. % stearic acid.

9. The method of claim 1, in which a ratio of polyglycerol to the one or more fatty acids ranges from 0.8:1 to 1.2:1.

10. The method of claim 1, in which the polyglycerol is not crosslinked.

11. The method of claim 1, further comprising mixing $CaCl_2$, KCl, or both with the aqueous phase, the clay-based component, and the polyglycerol-fatty acid complex to form the drilling fluid.

12. The method of claim 1, in which the drilling fluid comprises from 0.1 to 5 vol. % polyglycerol-fatty acid complex.

13. The method of claim 1, in which:
the clay-based component comprises lime, $CaCO_3$, bentonite, montmorillonite clay, barium sulfate, hematite, mullite, kaolin, alumina, silicon carbide, tungsten carbide, or combinations thereof; and
the aqueous phase comprises fresh water, salt water, brine, municipal water, formation water, produced water, well water, filtered water, distilled water, sea water, or combinations thereof.

14. The method of claim 1, further comprising mixing weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

15. A drilling fluid comprising:
an emulsion comprising an oleaginous phase suspended within an aqueous phase,
a clay-based component in the aqueous phase,
$CaCl_2$, KCl, or both in the aqueous phase, and
a polyglycerol-fatty acid complex formed by reacting a polyglycerol and a composition comprising one or more fatty acids, in which:
the polyglycerol-fatty acid complex is free of covalent crosslinks;
the polyglycerol-fatty acid complex comprises polyglycerol hydrogen bonded to a fatty acid; and
the oleaginous phase comprises safra oil and the polyglycerol-fatty acid complex.

16. The drilling fluid of claim 15, in which:
a ratio of polyglycerol to the composition comprising the one or more fatty acids ranges from 0.8:1 to 1.2:1;
the composition comprising one or more fatty acids comprises from 10 to 40 vol. % palmitic acid; and
the composition comprising one or more fatty acids comprises from 50 to 90 vol. % stearic acid; and
the drilling fluid comprises from 1 to 5 vol. % polyglycerol-fatty acid complex.

17. The drilling fluid of claim 15, in which the drilling fluid comprises a coefficient of friction of less than 0.1.

18. The drilling fluid of claim 15, in which:
the clay-based component comprises lime, $CaCO_3$, bentonite, montmorillonite clay, barium sulfate, hematite, mullite, kaolin, alumina, silicon carbide, tungsten carbide, or combinations thereof; and
the aqueous phase comprises fresh water, salt water, brine, municipal water, formation water, produced water, well water, filtered water, distilled water, sea water, or combinations thereof.

19. The drilling fluid of claim 15, further comprising weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

* * * * *